United States Patent
Dudar (10) Patent No.: US 10,704,482 B2
(45) Date of Patent: Jul. 7, 2020

(54) SYSTEM AND METHOD FOR MITIGATING WET-FOULING OF SPARK PLUGS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 15/892,299

(22) Filed: Feb. 8, 2018

(65) Prior Publication Data

US 2019/0242316 A1 Aug. 8, 2019

(51) Int. Cl.
| | | |
|---|---|---|
| *F02D 41/06* | (2006.01) | |
| *F01N 3/20* | (2006.01) | |
| *F02D 41/00* | (2006.01) | |
| *F02D 41/14* | (2006.01) | |
| *F02B 37/18* | (2006.01) | |
| *F02P 17/12* | (2006.01) | |
| *F02D 41/22* | (2006.01) | |
| *F02M 26/04* | (2016.01) | |

(52) U.S. Cl.
CPC ......... *F02D 41/062* (2013.01); *F01N 3/2013* (2013.01); *F02B 37/183* (2013.01); *F02D 41/0007* (2013.01); *F02D 41/0077* (2013.01); *F02D 41/1454* (2013.01); *F02D 41/221* (2013.01); *F02P 17/12* (2013.01); *F02D 41/1439* (2013.01); *F02D 2200/0404* (2013.01); *F02D 2250/06* (2013.01); *F02M 26/04* (2016.02); *Y10S 903/904* (2013.01)

(58) Field of Classification Search
CPC ............... F02D 41/062; F02D 41/0007; F02D 41/0077; F02D 41/1454; F02D 41/221; F02D 2200/0404; F02D 2250/06; F02D 41/1439; F01N 3/2013; F02B 37/183; F02P 17/12; F02M 26/04; Y10S 903/904
USPC ......................................................... 701/101
See application file for complete search history.

(56) References Cited

U.S. PATENT DOCUMENTS

| | | | | |
|---|---|---|---|---|
| 4,205,650 A * | 6/1980 | Szwarcbier | ............. | F02N 19/02 123/146.5 A |
| 5,752,488 A * | 5/1998 | Hattori | .................. | F02D 41/061 123/179.16 |
| 6,505,605 B2 * | 1/2003 | Yamada | .................. | F02D 37/02 123/406.12 |
| 7,523,744 B2 * | 4/2009 | Ayame | ................ | F02D 41/0025 123/1 A |
| 8,150,604 B2 * | 4/2012 | Ma | .......................... | F02D 37/02 701/111 |

(Continued)

OTHER PUBLICATIONS

Dudar, A., "System and Method for Mitigating Wet-Fouling of Spark Plugs," U.S. Appl. No. 15/809,017, filed Nov. 10, 2017, 109 pages.

Primary Examiner — David Hamaoui
Assistant Examiner — John D Bailey
(74) Attorney, Agent, or Firm — Geoffrey Brumbaugh; McCoy Russell LLP (57) ABSTRACT

Methods and systems are provided for drying a wet-fouled spark plug during engine flooding conditions. In one example, a method may include, reverse rotating the engine unfueled and activating a heating element of an exhaust catalyst to flow heated ambient air through the combustion chamber to dry the wet-fouled spark plug.

20 Claims, 6 Drawing Sheets

(56) References Cited

U.S. PATENT DOCUMENTS 9,790,874 B2* 10/2017 Dudar .................... F02D 9/105
2017/0204796 A1* 7/2017 Dudar .................. F02D 41/221

* cited by examiner

SYSTEM AND METHOD FOR MITIGATING WET-FOULING OF SPARK PLUGS

FIELD

The present description relates generally to methods and systems for drying wet-fouled spark plugs of an engine.

BACKGROUND/SUMMARY

Engine ignition systems may include a spark plug for delivering an electric current to a combustion chamber of a spark-ignited engine, such as a gasoline engine, to ignite an air-fuel mixture and initiate combustion. Spark plug fouling may occur wherein a firing tip of the spark plug insulator becomes coated with a foreign substance, such as fuel or soot. Soot-fouled spark plugs include a carbon build-up on an electrode of the spark plug, whereas wet-fouled spark plugs include liquid fuel build-up around the electrode. Spark plugs may become wet-fouled due to engine flooding, for example. The engine may flood due to rich fueling during extreme temperature weather conditions, when an operator depresses/pumps the gas pedal repeatedly during cranking, or due to excess fuel inside the cylinders (e.g., due to a degraded fuel injector). When the spark plugs become wet-fouled, they are unable to produce a spark across the electrode, thus delaying or preventing engine start. In some instances, engine flooding may cause a frustrated vehicle operator to continue cranking the engine until the battery drains. Further, vehicle emissions may be increased due to repeated unsuccessful cranks while the engine is flooded.

One example approach to address spark plug wet-fouling is shown by Dudar in U.S. Pat. No. 9,790,874. Therein, upon detection of a fouled spark plug prior to an engine start, ambient air may be drawn in though the evaporative emissions control (EVAP) system and routed to one or more engine cylinders. The ambient air may be drawn in by operating a pump of the EVAP system and the air may be heated via a heater coupled to a fuel vapor canister of the EVAP system. The flow of heated ambient air through the engine cylinders facilitate in drying the spark plugs.

However, the inventors herein have recognized potential issues with such systems. As one example, the fuel vapor canister of the EVAP system may be saturated with fuel vapor and by drawing in ambient air through the fuel vapor canister of the EVAP system, an undesired amount of fuel vapor may be routed to the engine cylinders during an engine non-combusting condition. Since the fuel vapors are not being combusted, there may be an increase in vehicle evaporative emissions. Further, the fuel vapors may impede drying of the wet spark plugs. Cranking the engine without providing additional airflow to dry the spark plugs may be inefficient, resulting in increased engine starting times. The increased engine starting times may increase vehicle operator frustration as well as consume excess battery charge.

In one example, the issues described above may be addressed by an engine method comprising: in response to flooding a combustion chamber of a spark ignition engine with fuel during an engine start attempt, shutting off fuel delivery to the combustion chamber, activating a heating element of a catalyst coupled to an exhaust passage of the engine, and spinning the engine in reverse to flow air heated by the heating element to the combustion chamber via the exhaust passage. In this way, by reverse rotating the engine and routing heated air from an electrically heated catalyst to the engine cylinders, fouled spark plugs may be dried.

In one example, in an electrically heated catalyst (EHC), a heating element coupled to the catalyst may be activated to heat the catalyst during engine start conditions in order to expedite catalyst light-off. Upon detection of a wet-fouled spark plug, the engine may be spun, unfueled, in a reverse direction via an engine motor. Due to the reverse rotation of the engine, ambient air may be drawn into the engine system via the exhaust passage. The heating element coupled to the EHC may be activated to heat the ambient air flowing to the engine cylinders via the EHC. The heated air upon entering the engine cylinders may dry the fouled spark plugs. After routing heated air through the engine cylinders for over a threshold duration, spark plugs coupled to one or more cylinders may be activated to generate spark. If a characteristic secondary waveform is detected for each spark that is generated, it may be confirmed that the spark plugs are dry. Upon confirmation that the spark plugs are dry, reverse rotation of the engine may be discontinued and the fueling may be resumed for engine start.

In this way, by opportunistically using existing engine components, such as an electrically heater catalyst, the need for additional equipment or external intervention for spark plug drying may be reduced or eliminated. By reverse rotating the engine, the drop in exhaust pressure may be utilized to draw in ambient air and dry out the spark plug. The technical effect of utilizing heated airflow for drying the spark plugs is that multiple spark plugs may be dried simultaneously as the engine is rotated and cylinder valves of each cylinders open and close periodically. Overall, wet-fouled spark plugs may be dried faster than when no additional airflow is provided, decreasing the engine starting times and thereby decreasing vehicle operator frustration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
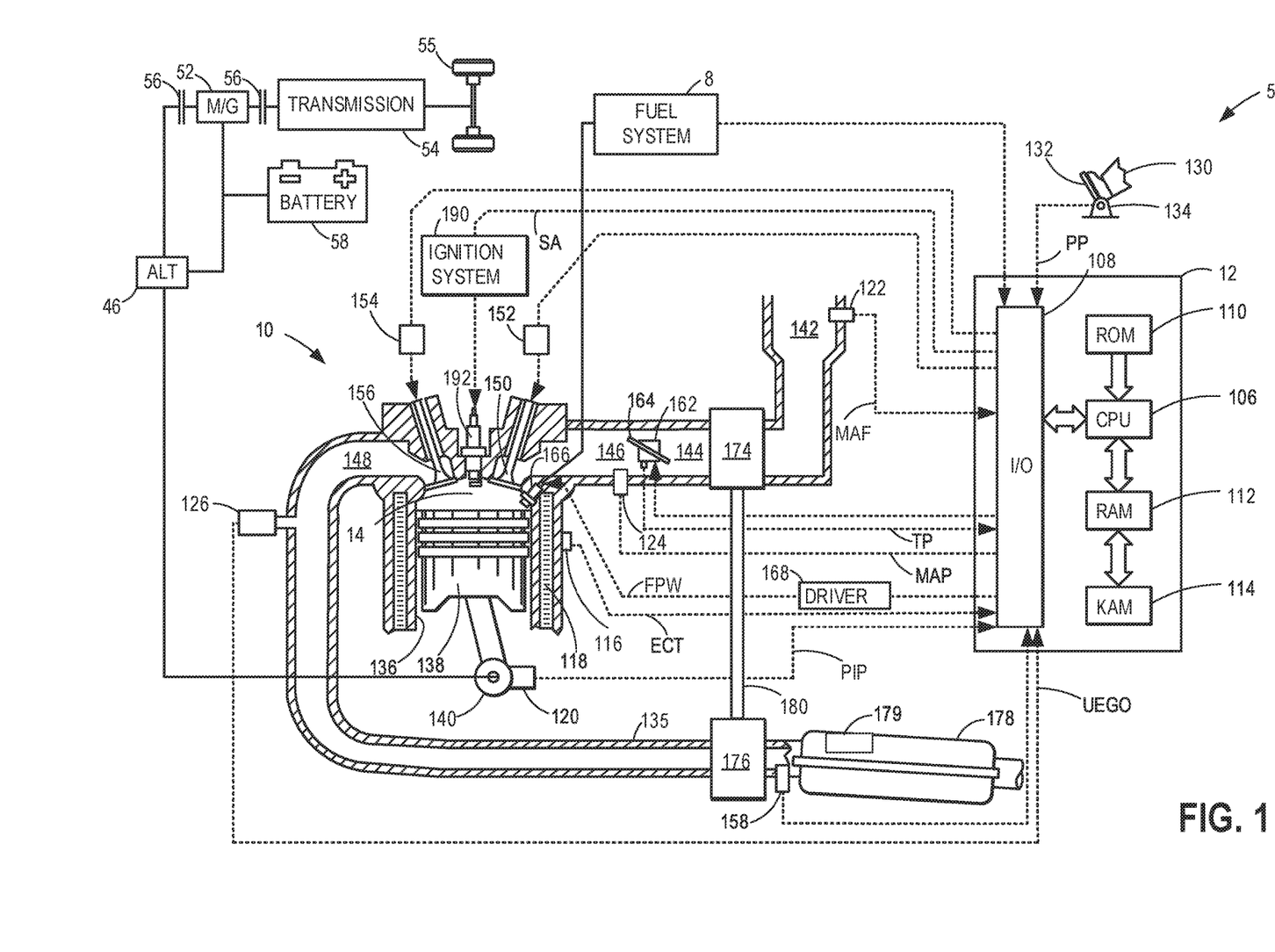
FIG. 1 schematically shows an example vehicle system including a spark plug.

The following description relates to systems and methods for mitigating spark plug wet-fouling in an engine system, such as the engine system shown in FIG. 1, by providing on-demand heated airflow. For spinning the engine unfueled in the forward and reverse directions, an H-bridge circuit may be utilized, such as the H-bridge circuit depicted at FIGS. 2A-2B. In response to an indication of spark plug wet-fouling, an engine controller of the vehicle may be configured to perform an example routine to dry one or more spark plugs, such as according to the method described in FIGS. 3 and 4. Upon drying, a functional spark plug may generate a secondary ignition pulse (waveform), such as a pulse shown in FIG. 5 which may be used to verify the spark plug is successfully dried out. An example engine operation to dry a wet-fouled spark plug is shown in FIG. 6.

FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, the vehicle 5 may comprise an autonomous vehicle and/or a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, electric heater coupled to an electrically heated catalyst (EHC), vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO. Emission control device 178 may be a three-way catalyst, a NOx trap, various other emission control devices, or combinations thereof. In the example of FIG. 1, emission control device 178 is an electrically heated catalyst (EHC). An electric heater (herein also referred to as a heating element) 179 may be coupled to the EHC 178 to electrically heat the catalyst during cold-start conditions. By actively heating the EHC 178, catalyst light-off may be expedited, thereby improving emissions quality during cold-start conditions.

An exhaust gas recirculation (EGR) delivery passage may be coupled to the exhaust passage upstream of turbine 176 to provide high pressure EGR (HP-EGR) to the engine intake manifold, downstream of compressor 174. An EGR valve may be coupled to the EGR passage at the junction of the EGR passage and the intake passage. EGR valve may be opened to admit a controlled amount of exhaust to the compressor outlet for desirable combustion and emissions control performance. EGR valve may be configured as a continuously variable valve or as an on/off valve. In further embodiments, the engine system may include a low pressure EGR (LP-EGR) flow path wherein exhaust gas is drawn from downstream of turbine 176 and recirculated to the engine intake manifold, upstream of compressor 174.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

During engine flooding conditions, the spark plug 192 may be wet-fouled and spark may not be generated. The engine flooding may be determined based on at least one of a position of the throttle 162 during an engine start attempt, an output of the exhaust gas sensor 126 during the engine start attempt, and a threshold number of engine start attempts being reached without combustion occurring in the combustion chamber. In one example, during engine flooding, the position of the throttle 162 is a wide open position and an output of the exhaust gas sensor 126 is richer than stoichiometric air fuel ratio. In order to dry the wet-fouled spark plug, fuel delivery to the combustion chamber may be shut off, the electric heater 179 of the catalyst 178 may be activated, and the engine may be rotated in reverse, via the electric machine 52, to flow air heated by the electric heater 179 to the combustion chamber 14 via the exhaust manifold 148 and the catalyst 178. After flowing the heated air through the combustion chamber 14 for over a threshold duration, the spark plug 192 may be activated, and/or in response to detection of a secondary pulse from the spark plug 192, it may be indicated that the combustion chamber is dry. In response to detection of a secondary pulse from the spark plug 192, the engine may no longer be rotated via the electric machine, and the vehicle operator may be notified to start the engine. In response to indication of drying of the combustion chamber 14, and upon attainment of a light-off temperature of the catalyst 178, operation of the electric heating 179 may be suspended.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may detect an indication of spark plug wet-fouling, such as based on signal TP from the throttle position sensor during an engine start attempt. In response to the indication of spark plug wet-fouling, the controller may activate the electric heater 179 and reverse rotate the engine via the electric machine 52 to flow heated air via the cylinder 14 until the spark plug is dried, as will be described with respect to FIG. 3.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Figure 2A:
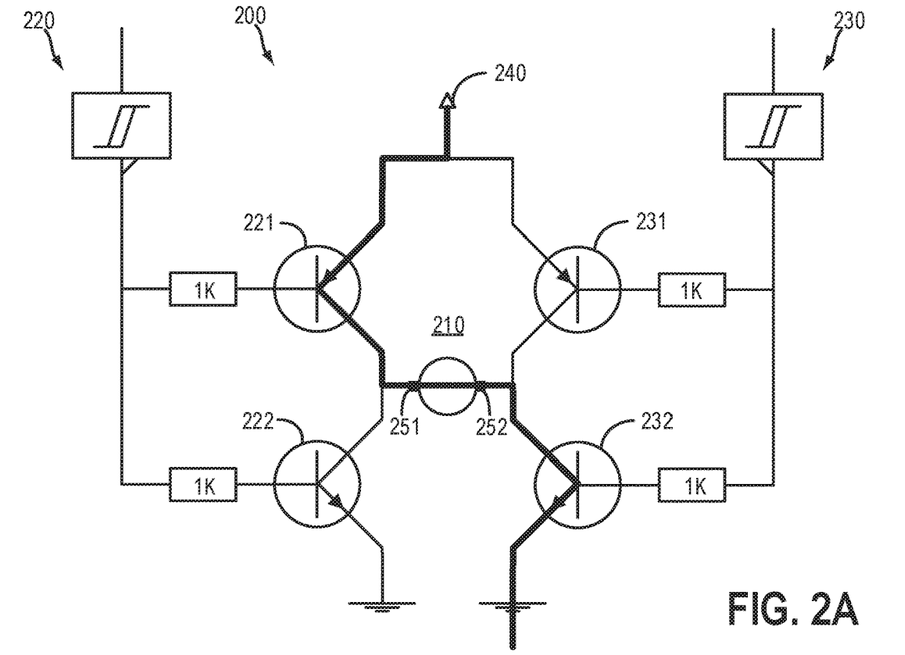
FIGS. 2A-2B schematically show an example H-bridge circuit which may be used to rotate a vehicle engine in a forward or reverse direction.
Figure 2B:
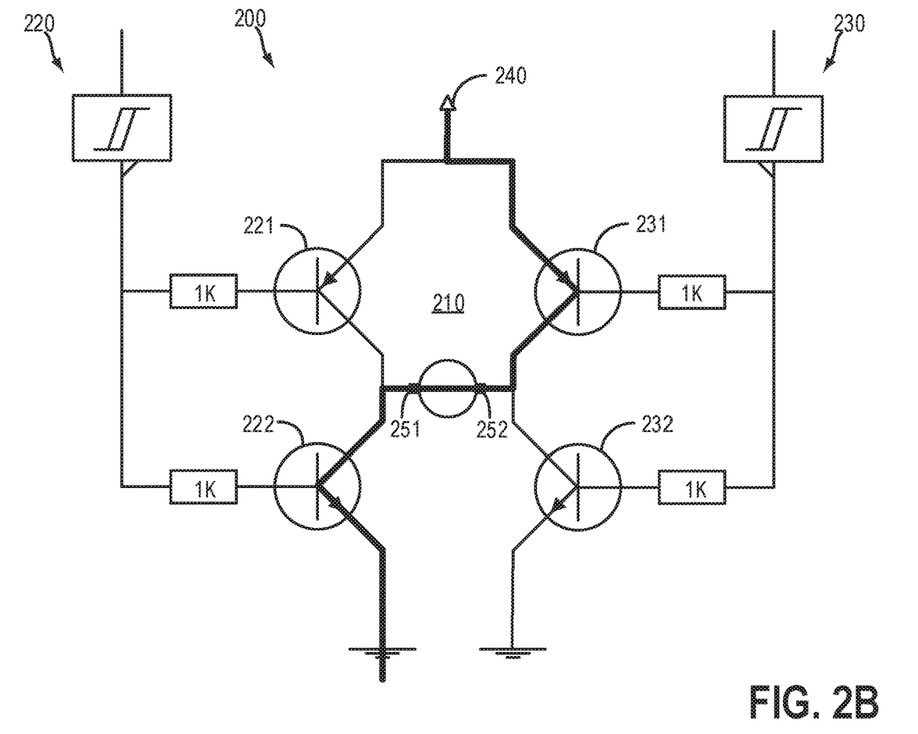

FIGS. 2A and 2B show an example circuit 200 that may be used for reversing a spin orientation of an electric motor. Circuit 200 schematically depicts an H-Bridge circuit that may be used to run a motor 210 in a first (forward) direction and alternately in a second (reverse) direction. Circuit 200 comprises a first (LO) side 420 and a second (HI) side 230. Side 220 includes transistors 221 and 222, while side 230 includes transistors 231 and 232. Circuit 200 further includes a power source 240.

In FIG. 2A, transistors 221 and 232 are activated (energized), while transistors 222 and 231 are off. In this configuration, the left lead 251 of motor 210 is connected to power source 240, and the right lead 252 of motor 210 is connected to ground. In this way, motor 200 may run in a forward (or default) direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 2B, transistors 222 and 231 are activated (energized), while transistors 221 and 232 are off. In this configuration, the right lead 252 of motor 210 is connected to power source 240, and the left lead 251 of motor 210 is connected to ground. In this way, motor 210 may run in a reverse direction.

In this way, the components of FIGS. 1-2B provide for a system comprising: a vehicle, including an autonomous vehicle and/or a hybrid vehicle, an electric machine, an engine including one or more cylinders, an intake passage, and an exhaust passage, each cylinder including a spark plug, an intake throttle coupled to the intake passage, an electrically heated catalyst (EHC) including an electric heater, and an oxygen sensor coupled to the exhaust passage, and a controller with computer readable instructions stored on non-transitory memory that when executed during an engine-off condition, and during an indication of engine flooding and prior to an engine start, cause the controller to: activate the electric heater of the EHC, dry each cylinder simultaneously by providing a heated airflow from the exhaust passage to the one or more cylinders via the EHC, and in response to each of a generation of secondary pulses by spark plugs coupled to each cylinder and the electric heater temperature of the EHC increasing above a light-off temperature, deactivate the electric heater.

Figure 3:
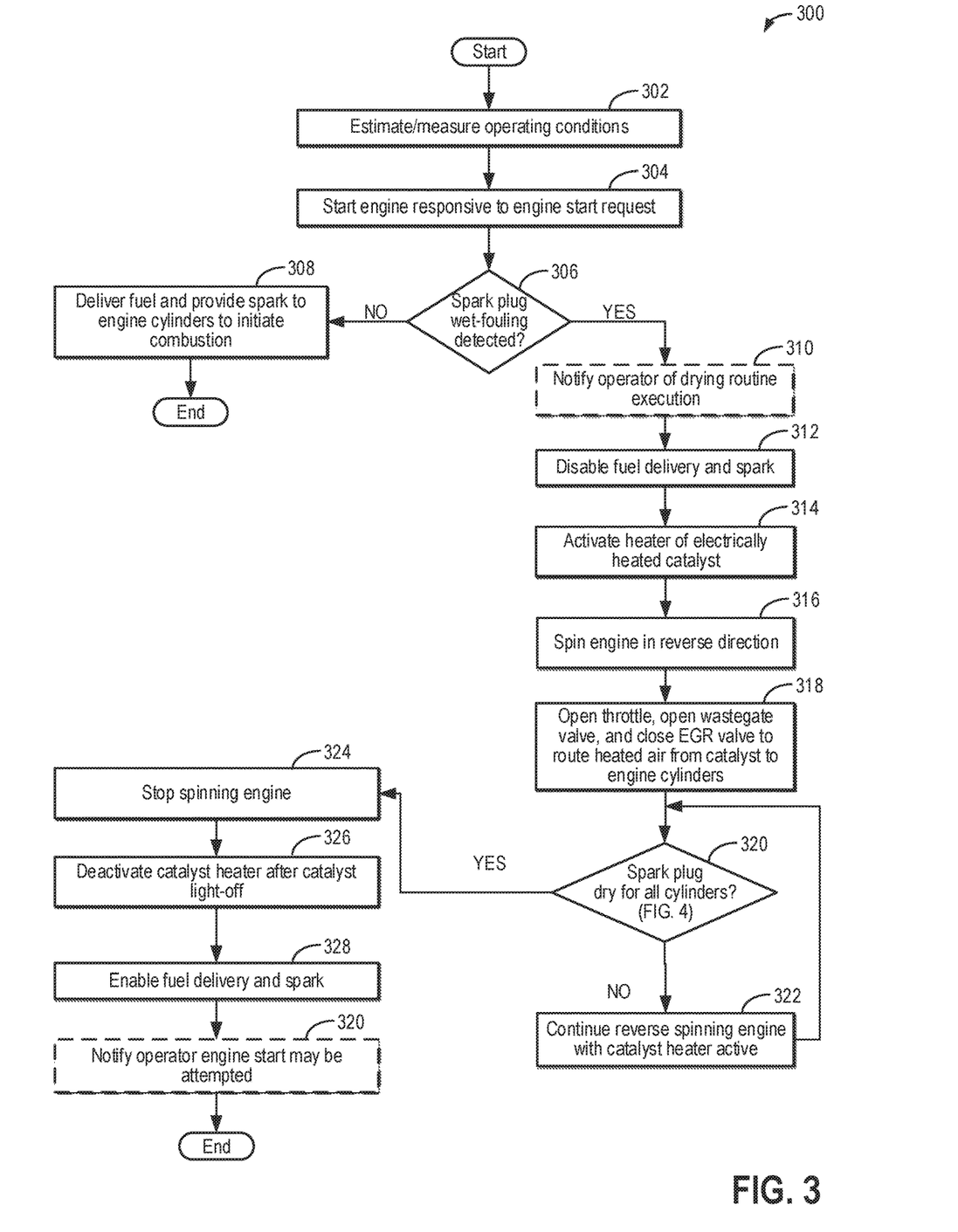
FIG. 3 shows a flow chart illustrating an example method for drying wet-fouled spark plugs.

FIG. 3 shows an example method 300 that may be implemented to dry a wet-fouled spark plug during an engine flooded condition. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, method 300 may be executed prior to an engine start attempt so that wet-fouled spark plugs may be detected during the engine start attempt and subsequently dried using heated airflow.

Method 300 begins at 302 and includes estimating and/or measuring operating conditions. Operating conditions may include, for example, ambient temperature, ambient pressure, ambient humidity, throttle position (e.g., from signal TP output by a throttle position sensor), accelerator pedal position (e.g., signal PP output by a pedal position sensor), an exhaust gas air-fuel ratio (e.g., as determined from signal UEGO output by the exhaust gas sensor), engine coolant temperature, a state of the engine, and an ignition state of the vehicle. The state of the engine may refer to whether the engine is on (e.g., operating at a non-zero speed, with combustion occurring within engine cylinders) or off (e.g., at rest, without combustion occurring in the engine cylinders). The ignition state of the vehicle may refer to a position of an ignition switch. As an example, the ignition switch may be in an "off" position, indicating that the vehicle is off (e.g., powered down, with a vehicle speed of zero), but with an ignition key inserted (e.g., by a vehicle operator), indicating that a vehicle start may soon be requested. As another example, the vehicle may be on and operating in an electric-only mode, in which an electric machine (e.g., electric machine 52 of FIG. 1) supplies torque to propel the vehicle and the engine is off and does not supply torque to propel the vehicle.

At 304, method 300 includes starting the engine responsive to an engine start request. In one example, the engine is started in response to the vehicle operator switching the ignition switch to an "on" position, such as by turning the ignition key, depressing an ignition button, or requesting an engine start from a remote device (such as a key-fob, smartphone, a tablet, etc.). In another example, the engine is started in response to the vehicle transitioning from the electric-only mode to an engine mode in which combustion occurs in the engine and the vehicle is propelled at least partially by engine-derived torque. For example, the vehicle may be transitioned to the engine mode when a state of charge (SOC) of a system battery (e.g., system battery 58 of FIG. 1) drops below a threshold SOC. The threshold SOC may be a positive, non-zero battery SOC level below which the system battery may not be able to support or execute additional vehicle functions while propelling the vehicle via torque derived from the electric machine. As another example, the vehicle may be transitioned to the engine mode if vehicle operator torque demand rises above a threshold torque. The threshold torque may be a positive, non-zero amount of torque that cannot be met or sustained by the electric machine alone, for example. Starting the engine may include cranking the engine with an electric motor, such as a starter motor or the electric machine. The engine may be cranked at a speed that enables combustion to commence and the engine to maintain momentum during starting, such as a speed in the range of 50-100 RPM, for example.

At 306, it is determined if spark plug wet-fouling is detected. For example, spark plug wet-fouling may be detected if there is an indication of a flooded engine. The flooded engine may be indicated by a wide open throttle (WOT) signal, generated when the vehicle operator depresses the accelerator pedal to its maximum extent, during engine cranking. In some examples, the controller may be configured to reduce or cease fuel injection during cranking in response to the WOT signal, such as by reducing or completely suppressing fuel injection pulses, thereby preventing the spark plugs from becoming coated with fuel. In other examples, a WOT signal during cranking is an indication of spark plug wet-fouling. As another example, the flooded engine may be inferred by the exhaust gas sensor indicating a rich AFR during cranking (e.g., an AFR determined from an output of the exhaust gas sensor is less than a threshold AFR). As still another example, the flooded engine (and therefore, spark plug wet-fouling) may be inferred by a lack of engine start after a predetermined number of engine start attempts.

If spark plug wet-fouling is not detected, such as when the WOT signal is not present during cranking, the determined AFR is not less than the threshold AFR, or the engine starts within the predetermined number of engine start attempts, method 300 proceeds to 308 and includes delivering fuel and providing spark to the engine cylinders to initiate combustion. For example, fuel may be delivered to the engine cylinders by actuating fuel injectors with a nominal fuel pulse-width for an engine start and the given operating conditions. The controller may determine the fuel pulse-width by inputting the operating conditions, including ambient humidity, MAF (as output by a MAF sensor, such as MAF sensor 122 of FIG. 1), the determined AFR, and a desired AFR, into one or more look-up tables, algorithms, and/or maps and output the fuel pulse-width to send to the fuel injectors. Similarly, spark may be provided at a nominal spark timing for the starting operation and the given operating conditions, such as at or near maximum brake torque (MBT) timing. The controller may input the operating conditions (such as engine speed and load, engine coolant temperature, ambient temperature, exhaust temperature, MAP, etc.) into one or more look-up tables, algorithms, and/or maps and output the spark timing. A signal SA sent to an ignition system (e.g., ignition system 190 of FIG. 1) at the determined spark timing may trigger firing of the spark plug to ignite the air-fuel mixture. Following 308, method 300 ends.

If spark plug wet-fouling is detected at 306, method 300 proceeds to 310 and optionally includes notifying the vehicle operator that a drying routine is being executed. For example, a message may be displayed to the vehicle operator, such as on a human-machine interface on a dash of the vehicle, stating that the drying routine is being executed and not to attempt further engine starts until prompted. With the vehicle operator notified, the vehicle operator may cease further engine start attempts, thereby avoiding potentially draining the system battery.

At 312, method 300 includes disabling fuel delivery and spark. With the engine flooded, delivery of additional fuel may exacerbate the wet-fouling, increase vehicle emissions, degrade an emission control device (e.g., emission control device 178 of FIG. 1), and reduce fuel economy. By disabling fuel delivery, such as by maintaining the fuel injectors closed, further wet-fouling, emission control device degradation, increased vehicle emissions, and reduced fuel economy may be avoided. When wet-fouled, a spark plug may not be able to produce a spark across its electrode, and therefore, actuating the spark plug may be ineffective. Disabling spark in response to an indication of spark plug wet-fouling may reduce energy consumption and prevent excess spark plug wear, for example.

At 314, the controller may send a signal to the electric heater coupled to the electrically heated catalyst (such as EHC 178 in FIG. 1) to activate the electric heater. Power may be supplied to the electric heater via a system battery (such as battery 58 in FIG. 1). In one example, if engine start is requested during a lower than threshold temperature (such as the light-off temperature) of the EHC, the electric heater may already be in an active state, and the active state of the heater is maintained. The electric heater actively heats the EHC during cold-start conditions in order to expedite attainment of catalyst light-off temperature.

At 316, the routine includes rotating or spinning the engine unfueled at a predetermined speed (e.g., predetermined RPM), in the reverse direction. Rotating the engine in the reverse direction may comprise rotating the engine in the opposite direction as when the engine is operated to combust air and fuel. Rotating the engine unfueled in the reverse direction may include routing air flow through the exhaust system, the engine cylinders, and the intake manifold, in that order. Rotating the engine unfueled in the reverse direction may comprise rotating the engine via the motor (such as electric machine 52 in FIG. 1), where the motor may be powered via the onboard energy storage device (such as battery 58 in FIG. 1), such as a battery. In a non-hybrid vehicle, the engine may be reverse rotated via a starter motor and a battery of the vehicle. To rotate the engine in reverse, an H-bridge circuit, such as that depicted at FIGS. 2A-2B, may be utilized. The speed of the engine may be controlled via the motor, to the predetermined speed. The predetermined engine speed may comprise a speed at which a robust airflow may occur through the cylinders while the engine is being spun in reverse. In one example, the predetermined speed may be lower than 500 rpm.

At 318, the controller may send a signal to a throttle plate coupled to an intake throttle to open the intake throttle, the controller may send a signal to the wastegate valve coupled to the wastegate passage of an exhaust turbine to actuate the wastegate valve to an open position, and the controller may send a signal to the exhaust gas recirculation (EGR) valve coupled to an EGR passage to actuate the EGR valve to a completely closed position to enable a larger volume of ambient air entering the engine system via the exhaust system to be routed to the engine cylinders via the EHC. In one example, the intake throttle may be opened to a wide open position, the wastegate valve may be completely opened, and the EGR valve may be fully closed. By opening the intake throttle, a larger volume of ambient air may be drawn in by rotating the engine. Since the wastegate passage provides a lower resistance path for airflow relative to the exhaust turbine, by opening the wastegate valve, at least a portion of the ambient air may flow from the EHC to the engine cylinders via the least resistance path (through the wastegate passage), bypassing the turbine. As the EGR valve is closed, ambient air may not flow from the exhaust passage to the intake passage via the EGR passage and the entire volume of air may be routed through the engine cylinders. In addition, a canister purge valve coupling the engine intake manifold to a fuel vapor canister of an evaporative emissions control (EVAP) system may be actuated to a closed position to isolate the engine intake manifold from the fuel vapor system.

As ambient air entering the engine system via the exhaust passage may be routed to the engine cylinders via the EHC, the ambient air may be heated by the electric heater. Due to the spinning of the engine, the exhaust and the intake valves of each of the engine cylinders may open and close periodically. The heated air from the EHC may enter the engine cylinders via the corresponding exhaust valve and exit the cylinders via the corresponding intake valve. As the heated air flows through the engine cylinders, the thermal energy from the air dries the cylinder interior including the spark plug.

Figure 4:
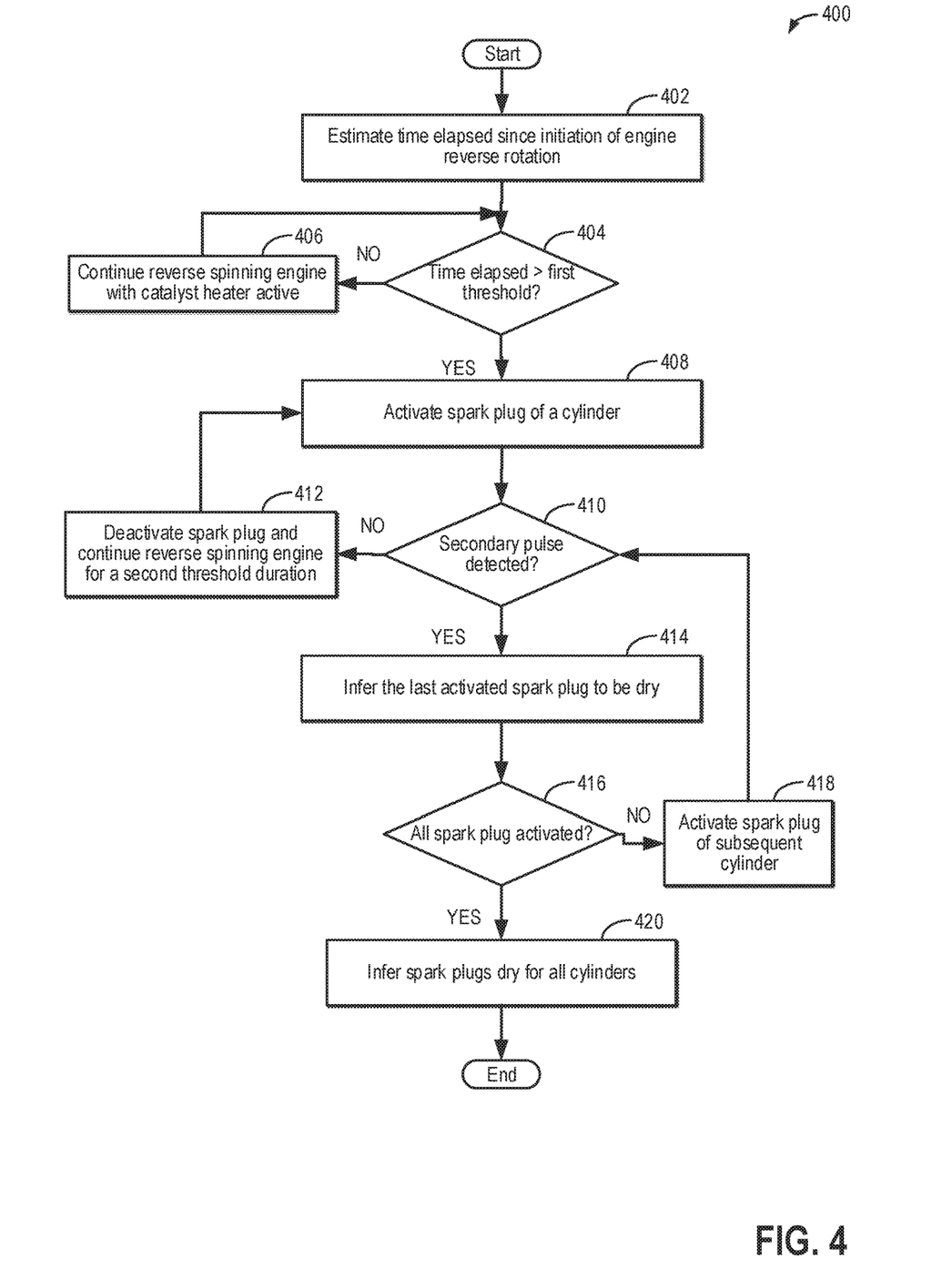
FIG. 4 shows a flow chart illustrating an example method for determining if the wet-fouled spark plugs are dry.

At 320, the routine includes determining if the spark plugs of each engine cylinder is dry. FIG. 4 shows an example route 400 to determine if the spark plugs of each cylinder has been dried. If it is determined that one or more spark plugs have not yet dried, heated air may be continued to be routed through the engine cylinders. At 322, the engine may be continued to be reverse rotated with the electric heater coupled to the EHC active. If it is determined that each spark plug coupled to the one or more engine cylinders is dry, at 324, the controller may send a signal to an actuator coupled to the electric machine to stop spinning the engine. In this way, when a predetermined number of the spark plugs are indicated as dry, the engine reverse spinning may be deactivated. In one example, the predetermined number of the spark plugs may be the total number of spark plugs in the engine. At 326, the controller may send a signal to the electric heater coupled to the EHC to deactivate the heater upon confirmation that the EHC has attained its light-off temperature. If after drying the spark plugs, it is observed that the catalyst temperature is below the light-off temperature, the electric heater may be operated until the catalyst temperature increases to above the light-off temperature.

At 328, fuel delivery and spark may be enabled. Enabling fuel delivery and spark may include actuating a fuel pump to provide fuel to fuel injectors at a high pressure. However, the fuel injectors may not yet be actuated open. In this way, fuel may be readied for injection in response to an engine start request, such as an engine start request from the vehicle operator. Similarly, enabling spark may include enabling a spark advance signal to be transmitted from the controller to an ignition system (e.g., ignition system 190 of FIG. 1) in anticipation of the engine start request but not yet transmitting the signal. By enabling fuel delivery and spark, combustion may be initiated in the engine cylinders in response to the engine start request.

At 320, method 300 optionally includes notifying the vehicle operator that an engine start may be attempted. For example, a message may be displayed to the vehicle operator, such as on the human-machine interface on the dash of the vehicle, stating that the engine start may be attempted.

In this way, prior to start of an engine having one or more cylinders, each coupled to a spark-plug, during conditions of spark plug wet-fouling, the spark plugs may be dried by routing heated air through the one or more cylinders while the engine is reverse rotated, the air heated by a heater coupled to an electrically heated catalyst (EHC).

FIG. 4 shows an example method 400 that may be implemented to confirm if each spark-plug coupled to each of the engine cylinders have dried. The method 400 may be a part of method 300 and may be carried out in step 320 of method 300 in FIG. 3.

At 420, the controller may estimate the time elapsed since initiation of engine reverse rotation. In one example, a timer may be started when engine reverse rotation is initiated and the time elapsed since the initiation of engine reverse rotation may be estimated from the timer. As described in step 316 of method 300, since the initiation of engine reverse rotation, heated air may be circulated through the engine cylinders, thereby drying the spark plugs. At 404, the routine includes determining if the time elapsed since initiation of engine reverse rotation is higher than a first threshold duration. The first threshold duration may be a non-zero predetermined duration predicted to dry even a severely wet-fouled spark plug via heated air while the engine is being reverse rotated, unfueled.

If it is determined that the time elapsed since the initiation of engine reverse rotation is lower than the first threshold duration, at 406, the engine may be continued to be reverse rotated with the electric heater coupled to the electrically heated catalyst active. Heated air may continue to flow through the flooded engine cylinders. If it is determined that the time elapsed since the initiation of engine reverse rotation is higher than the first threshold duration, the controller may infer that the spark plugs coupled to each engine cylinder has dried.

The controller may also individually determine if each spark plug has dried. At 408, the controller may send a signal to a first spark plug coupled to a first cylinder to actuate the spark plug in the absence of fueling and a secondary ignition pulse of the coil of the spark plug may be monitored via an ammeter coupled to the activated spark plug.

Figure 5:
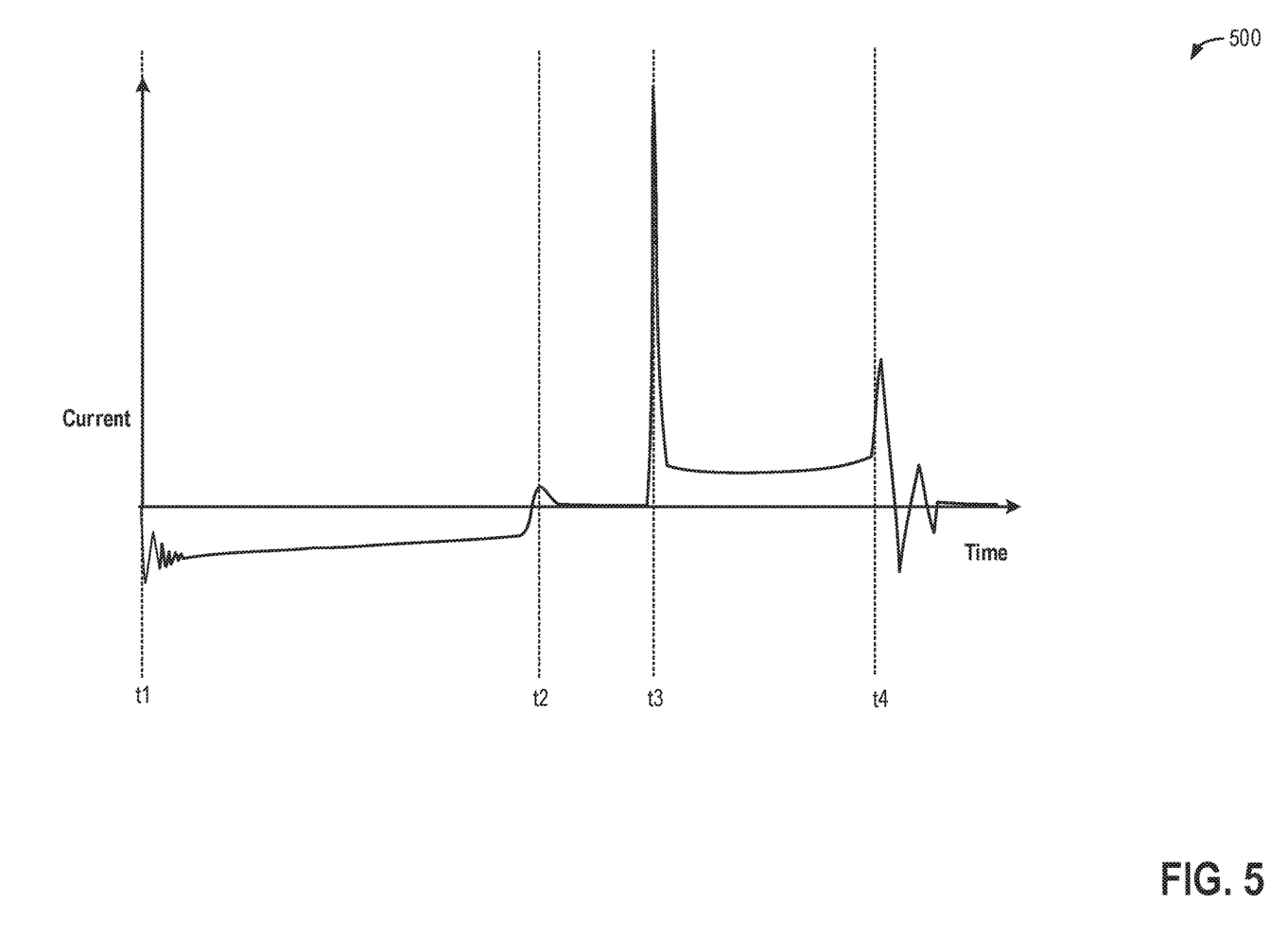
FIG. 5 shows an example secondary ignition pulse emitted by a functional spark plug.
Figure 6:
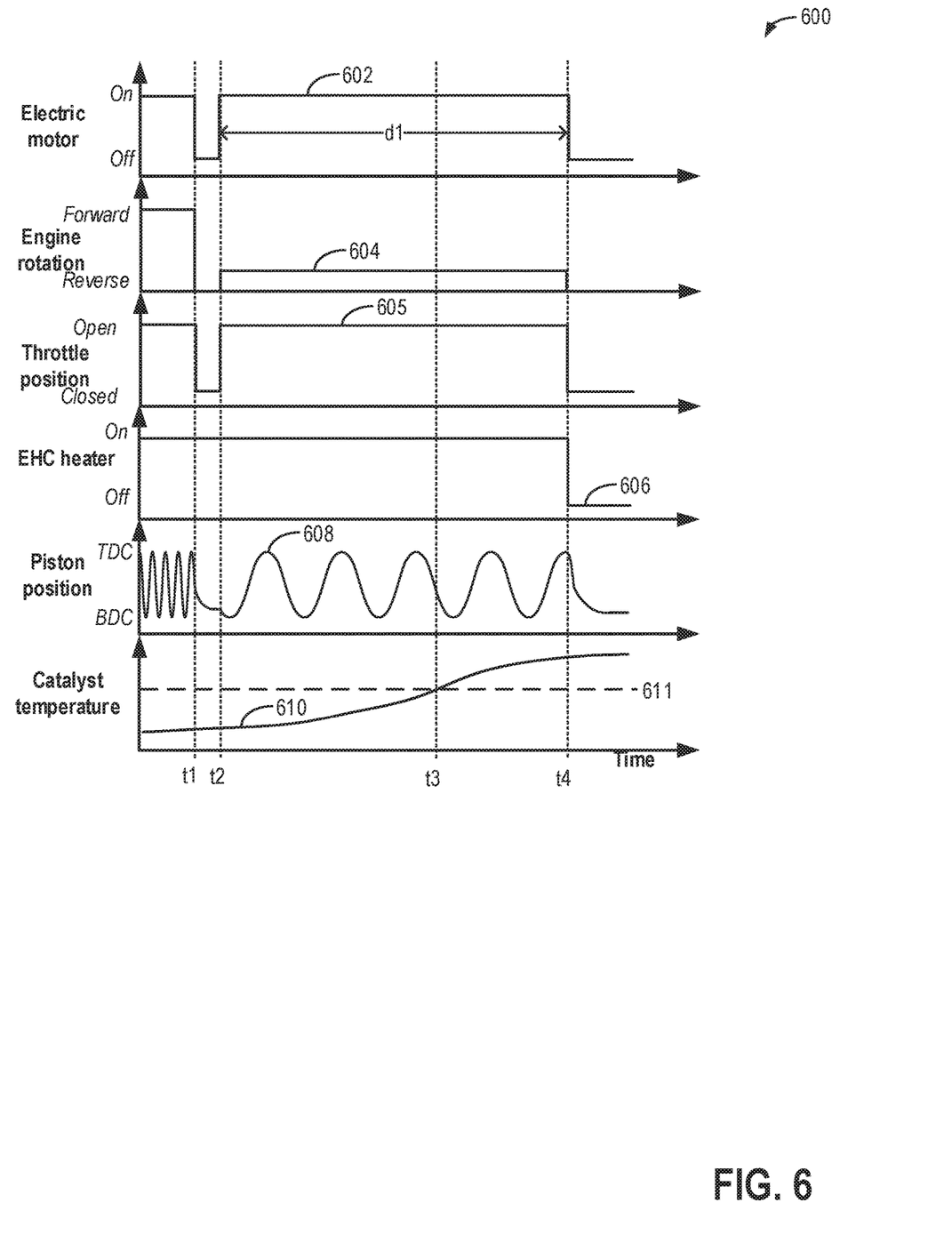
FIG. 6 shows an example drying of a wet-fouled spark plug, according to the present disclosure.

FIG. 5 shows an example secondary ignition pulse (waveform) generated by a functional and dry spark plug. The x-axis shows time and the y-axis shows an amplitude of current flowing through a primary circuit of the spark plug as recorded by ammeter coupled to the spark plug. Prior to time t1, there is no current flowing through the primary circuit. At time t1, current may start flowing through the primary circuit. At time t2, current flow via the primary circuit may be limited and at time t3, the spark may be fired. The dwell time of the current flowing through the primary circuit is between time t1 and t3. Between time t3 and t4, the spark may burn causing ignition of the air fuel mixture in the cylinder. At 410, the routine includes determining if a secondary ignition pulse is detected from the spark plug (first) that has been activated. If it is determined that the secondary ignition pulse has not been detected, it may be inferred that the spark plug that has been activated may not be dry at the time and further drying may be desired. At 412, the spark plug that was activated may be deactivated and the reverse spinning of the engine may be continued with the electric heater activated for a second threshold duration. By continuing engine reverse spinning, further heated air may be supplied to the spark plug to dry the plug. The second threshold duration may be a non-zero predetermined duration predicted to remove any residual moisture from engine cylinders. After the second threshold duration has elapsed, the routine may return to step 408 to activate the spark plug and monitor the secondary ignition pulse.

If at 410 it is determined that the secondary ignition pulse is detected, at 414, it may be inferred that the spark plug which was last activated is dry. At 416, the routine includes determining if each spark plug coupled to each of the engine cylinders have been activated (and secondary ignition pulse detected) to ensure that each of the spark plugs have been dried. If it is determined that all of the spark plugs have not yet been activated, at 418, the second spark plug coupled to a second cylinder may be activated. In a cylinder bank, the second cylinder may be immediately subsequent to the first cylinder (the first spark plug coupled to the first cylinder was last activated). The routine may proceed to step 410, wherein the secondary ignition pulse corresponding to the second spark plug may be monitored. In this way, spark plugs coupled to each cylinder may be activated one after the other without injecting fuel, and a secondary ignition pulse corresponding to each spark plug may be monitored via one or more ammeters coupled to each of the spark plugs to confirm that the individual spark plugs have dried.

If it is determined that all the spark plugs have been activated, at 420, it may be inferred that secondary waveforms have been obtained upon actuation of each spark plug (one after the other) in the engine, and all the spark plugs are dry. The routine may then proceed to step 324 of routine 300 in FIG. 3.

In this way, heated air is routed through the one or more cylinders until a threshold duration has elapsed, and after the threshold duration has elapsed, a first spark plug coupled to a first cylinder may be activated, responsive to a secondary pulse being generated by the first spark plug, a second spark plug coupled to a different cylinder may be activated, and responsive to the secondary pulse being generated by the second spark plug, it may be indicated that each of the first spark plug and the second spark plugs are dry.

FIG. 6 shows an example timeline 600 illustrating drying of a wet-fouled spark plug (such as spark plug 192 in FIG. 1) coupled to an engine cylinder (such as cylinder 14 in FIG. 1). The horizontal (x-axis) denotes time and the vertical markers t0-t4 identify significant times in the routine for drying the spark plug. A wet-fouled spark plug can be dried by flowing heated air through the engine cylinder for a threshold duration, d1. The threshold duration may be calibrated based on a predicted time to dry a severely wet spark plug.

The first plot, line 602, shows a state of operation of an electric motor (such as electric machine 52 in FIG. 1). In one example, the electric motor may be a starter motor. The second plot, line 604, shows direction of rotation of the engine. The engine may be rotated in a forward, default direction, or a reverse direction via the electric machine, the reverse direction opposite to the forward direction. The third plot, line 605, shows an opening of an intake throttle coupled to the engine intake manifold. In the third plot, the vertical axis represents the position of the throttle from "closed" (referring to a fully closed position of the throttle) to "open" (referring to a fully open position of the throttle). The fourth plot, line 606, shows a state of operation of an electric heater coupled to an electrically heated catalyst (EHC) housed in the engine exhaust passage. The electric heater may be operated to heat the EHC during cold-start conditions to expedite catalyst light-off. The fifth plot, line 608, shows a piston position of the cylinder. In the fifth plot, the vertical axis shows the piston position from bottom dead center ("BDC") to top dead center ("TDC"). The sixth plot, line 610, shows a temperature of the EHC as estimated via an exhaust temperature sensor. Dashed line 611 denotes a threshold temperature below which catalyst heating is desired. The threshold 611 may be calibrated based on the catalyst light-off temperature.

Prior to time t1, the electric motor is on to rotate a crankshaft of the engine in response to an engine start request from a vehicle operator. As the engine is rotated (e.g., cranked), a piston within the engine cylinder travels between BDC and TDC. During the cranking, the throttle is fully open, such as due to the vehicle operator fully depressing an accelerator pedal. As a result, the engine is flooded, and spark plug wet-fouling occurs. Due to the spark plug wet-fouling, the engine does not start, and the start attempt ceases at time t1 when the electric motor is deactivated. Based on a lower than threshold 611 catalyst temperature, the electric heater is activated to actively provide heat to the catalyst.

At time t1, in response to the spark plug wet-fouling condition (e.g., as determined based on the throttle position and the engine not starting), a controller initiates a spark-plug drying routine. The intake throttle is actuated to a closed position. After the electric motor is deactivated and no longer rotates the engine crankshaft, between time t1 and time t2, the pistons may briefly continue to move due to momentum before coming to a rest.

At time t2, the controller sends a signal to the electric motor to rotate the engine in reverse. As the engine is rotated, the piston moves from BDC to TDC and correspondingly the exhaust valve and the intake valve opens and closes. Due to the reverse rotation of the engine, ambient air is drawn into the engine system via the exhaust passage and the air then flows to the engine cylinders via the EHC. The controller sends a signal to the throttle plate of the intake throttle to completely open the throttle in order to increase the volume of air flowing through the engine system. Between t2 and t3, as the ambient air flows through the EHC, the air is heated by the active electric heater and the heated air is routed to the intake manifold via the cylinder. The heat from the air causes the fuel flooding the cylinder to evaporate, thereby drying the cylinder.

At time t3, the EHC temperature increases to above the threshold temperature 411, indicating that the catalyst has attained its light-off temperature. However, it is observed that the threshold duration d1 has not elapsed since the reverse spinning of the engine is initiated. Therefore, even after the EHC has attained its light-off temperature, between time t3 and t4, the electric heater is maintained in the active state while the engine is reverse rotated to flow heated air through the cylinder.

At time t4, in response to completion of the threshold duration d1, the controller sends a signal to the electric motor to suspend rotating the engine. The controller also, sends a signal to the electric heater to deactivate the heater.

The throttle is also actuated to a closed position. With the spark plug dried, the vehicle operator is notified that an engine start may be attempted.

In this way, by determining spark plug wet-fouling and utilizing existing engine components, spark plugs may be dried and engine start may be expedited without external intervention. The technical effect of reverse rotating the engine is that ambient air may be routed to the cylinder via an electrically heated catalyst and the heated airflow may be used to dry the engine cylinder. Overall, by drying the wet-fouled spark plugs faster using a heated airflow, engine starting times may be decreased and emissions quality may be improved.

An example engine method comprises: in response to flooding a combustion chamber of a spark ignition engine with fuel during an engine start attempt, shutting off fuel delivery to the combustion chamber, activating a heating element of a catalyst coupled to an exhaust passage of the engine, and spinning the engine in reverse to flow air heated by the heating element to the combustion chamber via the exhaust passage. In any preceding example, additionally or optionally, the spark ignition engine includes an intake passage having a throttle coupled therein and an exhaust gas sensor coupled to the exhaust passage, and the flooding is determined based on at least one of a position of the throttle during the engine start attempt, an output of the exhaust gas sensor during the engine start attempt, and a threshold number of engine start attempts being reached without combustion occurring in the combustion chamber. In any or all of the preceding examples, additionally or optionally, the position of the throttle is a wide open position and an output of the exhaust gas sensor is richer than stoichiometric air fuel ratio. In any or all of the preceding examples, additionally or optionally, the air heated by the heating element is drawn into the engine from atmosphere via the exhaust passage and the air flows to the combustion chamber via the catalyst. In any or all of the preceding examples, additionally or optionally, the combustion chamber includes a spark plug for supplying spark to the combustion chamber for combustion. In any or all of the preceding examples, the method further comprises, additionally or optionally, immediately prior to spinning the engine in reverse, opening the throttle to a wide open position, opening a wastegate valve housed in a wastegate passage coupled across an exhaust turbine, and closing an exhaust gas recirculation (EGR) valve coupled to an EGR passage. In any or all of the preceding examples, the method further comprises, additionally or optionally, after flowing the heated air through the combustion chamber for over a threshold duration, activating the spark plug, and in response to detection of a secondary pulse from the spark plug, indicating that the combustion chamber is dry. In any or all of the preceding examples, the method further comprises, additionally or optionally, in response to detection of a secondary pulse from the spark plug, discontinuing spinning the engine, and in response to absence of the secondary pulse, continuing spinning the engine in reverse. In any or all of the preceding examples, the method further comprises, additionally or optionally, in response to indication of drying of the combustion chamber and upon attainment of a light-off temperature of the catalyst, suspending operation of the heating element. In any or all of the preceding examples, additionally or optionally, the engine is spun in reverse, unfueled, via an electric motor.

Another example engine method comprises: prior to start of an engine having one or more cylinders, each coupled to a spark-plug, during conditions of spark plug wet-fouling, drying the spark plugs by routing heated air through the one or more cylinders while the engine is reverse rotated, the air heated by a heater coupled to an electrically heated catalyst (EHC). In any preceding example, additionally or optionally, the spark plug wet fouling conditions include an engine flooding condition when a spark is not generated. In any or all of the preceding examples, additionally or optionally, the air is drawn into the engine via an exhaust passage, and the air flows from the exhaust passage to the one or more cylinders via the EHC housed in the exhaust passage downstream of the one or more cylinders. In any or all of the preceding examples, additionally or optionally, the heater is powered by a battery coupled to the heater, the heater operated during a cold-start to heat the EHC until the EHC attains a light-off temperature. In any or all of the preceding examples, additionally or optionally, the heated air is routed through the one or more cylinders until a threshold duration has elapsed, the method further comprising, after the threshold duration has elapsed, activating a first spark plug coupled to a first cylinder, responsive to a secondary pulse being generated by the first spark plug, activating a second spark plug coupled to a different cylinder, and responsive to the secondary pulse being generated by the second spark plug, indicating that each of the first spark plug and the second spark plugs are dry, and deactivating engine reverse rotation when a predetermined number of the spark plugs are indicated as dry. In any or all of the preceding examples, additionally or optionally, the engine propels a vehicle which comprises an autonomous vehicle and/or a hybrid vehicle, and wherein the engine is cranked via an electric motor.

In yet another example, a system comprises: a vehicle, including an autonomous vehicle and/or a hybrid vehicle, an electric machine, an engine including one or more cylinders, an intake passage, and an exhaust passage, each cylinder including a spark plug, an intake throttle coupled to the intake passage, an electrically heated catalyst (EHC) including an electric heater, and an oxygen sensor coupled to the exhaust passage, and a controller with computer readable instructions stored on non-transitory memory that when executed during an engine-off condition, and during an indication of engine flooding and prior to an engine start, cause the controller to: activate the electric heater of the EHC, dry each cylinder simultaneously by providing a heated airflow from the exhaust passage to the one or more cylinders via the EHC, and in response to each of a generation of secondary pulses by spark plugs coupled to each cylinder and the electric heater temperature of the EHC increasing above a light-off temperature, deactivate the electric heater. In any preceding example, additionally or optionally, the indication of engine flooding includes each of a richer than stoichiometric air fuel ratio in the exhaust passage as estimated via the oxygen sensor and a wide open position of the intake throttle. In any or all of the preceding examples, additionally or optionally, the heated airflow is generated by spinning the engine in reverse via the electric machine to draw in ambient air through the exhaust passage, the ambient air heated by the electric heater en route to the one or more cylinders. In any or all of the preceding examples, additionally or optionally, generation of the secondary pulses include, activating the spark plugs coupled to each cylinder one by one without injecting fuel to the one or more cylinders and monitoring the secondary pulse via one or more ammeters coupled to each of the spark plugs.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
in response to flooding a combustion chamber of a spark ignition engine with fuel during an engine start attempt, shutting off fuel delivery to the combustion chamber, activating a heating element of a catalyst coupled to an exhaust passage of the engine, and spinning the engine in reverse to flow air heated by the heating element to the combustion chamber via the exhaust passage.

2. The method of claim 1, wherein the spark ignition engine includes an intake passage having a throttle coupled therein and an exhaust gas sensor coupled to the exhaust passage, and the flooding is determined based on at least one of a position of the throttle during the engine start attempt, an output of the exhaust gas sensor during the engine start attempt, and a threshold number of engine start attempts being reached without combustion occurring in the combustion chamber.

3. The method of claim 2, wherein the position of the throttle is a wide open position and an output of the exhaust gas sensor is richer than stoichiometric air fuel ratio.

4. The method of claim 1, wherein the air heated by the heating element is drawn into the engine from atmosphere via the exhaust passage and the air flows to the combustion chamber via the catalyst.

5. The method of claim 1, wherein the combustion chamber includes a spark plug for supplying spark to the combustion chamber for combustion.

6. The method of claim 2, further comprising, immediately prior to spinning the engine in reverse, opening the throttle to a wide open position, opening a wastegate valve housed in a wastegate passage coupled across an exhaust turbine, and closing an exhaust gas recirculation (EGR) valve coupled to an EGR passage.

7. The method of claim 5, further comprising, after flowing the heated air through the combustion chamber for over a threshold duration, activating the spark plug, and in response to detection of a secondary pulse from the spark plug, indicating that the combustion chamber is dry.

8. The method of claim 7, further comprising, in response to detection of a secondary pulse from the spark plug, discontinuing spinning the engine, and in response to absence of the secondary pulse, continuing spinning the engine in reverse.

9. The method of claim 7, further comprising, in response to indication of drying of the combustion chamber and upon attainment of a light-off temperature of the catalyst, suspending operation of the heating element.

10. The method of claim 1, wherein the engine is spun in reverse, unfueled, via an electric motor.

11. A method, comprising:
prior to start of an engine having one or more cylinders, each coupled to a spark-plug, during conditions of spark plug wet-fouling, drying the spark plugs by routing heated air through the one or more cylinders while the engine is reverse rotated, the air heated by a heater coupled to an electrically heated catalyst (EHC) which is positioned in an exhaust passage of the engine.

12. The method of claim 11, wherein the spark plug wet fouling conditions include an engine flooding condition when a spark is not generated.

13. The method of claim 11, wherein the air is drawn into the engine via the exhaust passage, and the air flows from the exhaust passage to the one or more cylinders via the EHC housed in the exhaust passage downstream of the one or more cylinders.

14. The method of claim 11, wherein the heater is powered by a battery coupled to the heater, the heater operated during a cold-start to heat the EHC until the EHC attains a light-off temperature.

15. The method of claim 11, wherein the heated air is routed through the one or more cylinders until a threshold duration has elapsed, the method further comprising, after the threshold duration has elapsed, activating a first spark plug coupled to a first cylinder, responsive to a secondary pulse being generated by the first spark plug, activating a second spark plug coupled to a different cylinder, and responsive to the secondary pulse being generated by the second spark plug, indicating that each of the first spark plug and the second spark plugs are dry, and deactivating engine reverse rotation when a predetermined number of the spark plugs are indicated as dry.

16. The method of claim 11, wherein the engine propels a vehicle which comprises an autonomous vehicle and/or a hybrid vehicle, and wherein the engine is cranked via an electric motor.

17. A system, comprising:
- a vehicle, including an autonomous vehicle and/or a hybrid vehicle;
- an electric machine;
- an engine including one or more cylinders, an intake passage, and an exhaust passage, each cylinder including a spark plug;
- an intake throttle coupled to the intake passage;
- an electrically heated catalyst (EHC) including an electric heater, and an oxygen sensor coupled to the exhaust passage; and
- a controller with computer readable instructions stored on non-transitory memory that when executed during an engine-off condition, and during an indication of engine flooding and prior to an engine start, cause the controller to:
- activate the electric heater of the EHC;
- dry each cylinder simultaneously by providing a heated airflow from the exhaust passage to the one or more cylinders via the EHC; and
- in response to each of a generation of secondary pulses by spark plugs coupled to each cylinder and the electric heater temperature of the EHC increasing above a light-off temperature, deactivate the electric heater.

18. The system of claim 17, wherein the indication of engine flooding includes each of a richer than stoichiometric air fuel ratio in the exhaust passage as estimated via the oxygen sensor and a wide open position of the intake throttle.

19. The system of claim 17, wherein the heated airflow is generated by spinning the engine in reverse via the electric machine to draw in ambient air through the exhaust passage, the ambient air heated by the electric heater en route to the one or more cylinders.

20. The system of claim 17, wherein generation of the secondary pulses include, activating the spark plugs coupled to each cylinder one by one without injecting fuel to the one or more cylinders and monitoring the secondary pulse via one or more ammeters coupled to each of the spark plugs.

* * * * *